United States Patent
Ahmad et al.

(10) Patent No.: US 11,648,900 B2
(45) Date of Patent: May 16, 2023

(54) OFF-ZONE CRASH DETECTION USING LATERAL ACCELERATIONS AT DIFFERENT POSITIONS IN A VEHICLE

(71) Applicant: Robert Bosch GmbH, Stuttgart (DE)

(72) Inventors: Rameez Ahmad, Canton, MI (US); Gunther Lang, Stuttgart (DE); Marc S. Teufel, Ditzingen (DE); Vivek Shirgod Manjunath, Karnataka (IN); Muhammed Hamid, Canton, MI (US); Rakesh Aswath Bandar, Karnataka (IN)

(73) Assignee: Robert Bosch GmbH, Stuttgart (DE)

( * ) Notice: Subject to any disclaimer, the term of this patent is extended or adjusted under 35 U.S.C. 154(b) by 234 days.

(21) Appl. No.: 17/130,264

(22) Filed: Dec. 22, 2020

(65) Prior Publication Data

US 2022/0024400 A1    Jan. 27, 2022

Related U.S. Application Data

(60) Provisional application No. 63/057,003, filed on Jul. 27, 2020.

(51) Int. Cl.
*B60R 21/0132* (2006.01)
*B60R 21/0136* (2006.01)
(Continued)

(52) U.S. Cl.
CPC ...... *B60R 21/0132* (2013.01); *B60R 21/0136* (2013.01); *B60R 2021/0006* (2013.01); *B60R 2021/01013* (2013.01)

(58) Field of Classification Search
CPC ............ B60R 21/0132; B60R 21/0136; B60R 2021/0006; B60R 2021/01013;
(Continued)

(56) References Cited

U.S. PATENT DOCUMENTS 5,247,466 A * 9/1993 Shimada ................. B60T 8/172
73/488
5,711,023 A * 1/1998 Eckert ................. B60W 10/184
701/72
(Continued)

FOREIGN PATENT DOCUMENTS

CN      204222578 U  *  3/2015
CN      109070825 A  * 12/2018   ......... B60R 21/0132
(Continued)

OTHER PUBLICATIONS

"Expanding design process of the Airbag Control Unit ACU—Connection of Active and Passive Safety by using vehicles dynamics for rollover and side crash detection," Ertlmeier et al. , 2008 International Workshop on Intelligent Solutions in Embedded Systems (pp. 1-9; Jul. 1, 2008. (Year: 2008).*

(Continued)

*Primary Examiner* — Khoi H Tran
*Assistant Examiner* — Jorge O Peche
(74) *Attorney, Agent, or Firm* — Michael Best & Friedrich LLP (57) ABSTRACT

Detecting off-zone crashes involving a vehicle using lateral acceleration values detected at locations within the vehicle. In one example method, an electronic processor receives a first acceleration value at a centerline of the vehicle from a first acceleration sensor of at least two acceleration sensors. The electronic processor also receives a second acceleration value at the centerline of the vehicle from a second acceleration sensor of the at least two acceleration sensors. The method also includes deriving, with the electronic processor, an approximate yaw acceleration at the centerline of the vehicle based on the first acceleration value and the second acceleration value. The method also includes comparing, with the electronic processor, the approximate yaw acceleration to a threshold and initiating, with the electronic (Continued)

processor, one or more actions in response to the yaw acceleration exceeding the threshold.

20 Claims, 7 Drawing Sheets

(51) Int. Cl.
    *B60R 21/01*            (2006.01)
    *B60R 21/00*            (2006.01)

(58) Field of Classification Search
    CPC ... B60R 2021/0009; B60R 2021/01327; G01P 15/00
    See application file for complete search history.

(56) References Cited

U.S. PATENT DOCUMENTS

| | | | | |
|---|---|---|---|---|
| 5,878,357 | A * | 3/1999 | Sivashankar | G01P 3/44 |
| | | | | 701/72 |
| 5,892,435 | A * | 4/1999 | Buchheim | B60R 21/0133 |
| | | | | 340/436 |
| 6,122,568 | A * | 9/2000 | Madau | B60G 17/019 |
| | | | | 701/1 |
| 6,139,120 | A * | 10/2000 | Fukada | B60T 8/246 |
| | | | | 701/72 |
| 6,175,796 | B1 * | 1/2001 | Ishikawa | B66F 17/003 |
| | | | | 280/755 |
| 6,305,709 | B1 * | 10/2001 | Okada | B60R 21/0132 |
| | | | | 701/45 |
| 6,816,804 | B1 * | 11/2004 | Lee | B60W 40/105 |
| | | | | 701/72 |
| 7,484,756 | B2 | 2/2009 | Le et al. | |
| 7,643,919 | B2 | 1/2010 | Nicaise | |
| 7,805,231 | B2 | 9/2010 | Cluff et al. | |
| 7,831,354 | B2 * | 11/2010 | Bauer | B60T 8/172 |
| | | | | 73/504.03 |
| 8,332,102 | B2 * | 12/2012 | Erb | B60R 21/0132 |
| | | | | 280/735 |
| 8,346,438 | B2 | 1/2013 | Breed | |
| 8,708,366 | B2 | 4/2014 | Clark et al. | |
| 9,900,747 | B1 * | 2/2018 | Park | G08G 1/0129 |
| 10,032,360 | B1 * | 7/2018 | Kelsh | G08B 25/016 |
| 11,348,340 | B1 * | 5/2022 | Sheng | G06V 10/98 |
| 2002/0029102 | A1 * | 3/2002 | Badenoch | B62D 7/146 |
| | | | | 180/443 |
| 2003/0005765 | A1 * | 1/2003 | Brudis | B60W 40/00 |
| | | | | 73/488 |
| 2003/0040849 | A1 * | 2/2003 | Hathout | B60W 50/0097 |
| | | | | 701/1 |
| 2003/0078700 | A1 * | 4/2003 | Chee | B60T 8/172 |
| | | | | 701/1 |
| 2005/0012312 | A1 * | 1/2005 | Roelleke | B60R 21/013 |
| | | | | 280/735 |
| 2005/0171672 | A1 * | 8/2005 | Wallner | B60R 16/0232 |
| | | | | 340/440 |
| 2006/0273657 | A1 * | 12/2006 | Wanke | B60T 8/17555 |
| | | | | 303/146 |
| 2007/0168098 | A1 * | 7/2007 | Lich | B60R 21/0132 |
| | | | | 701/45 |
| 2008/0077295 | A1 * | 3/2008 | Holzmann | B62D 6/006 |
| | | | | 701/43 |
| 2009/0012740 | A1 * | 1/2009 | Hain | B60C 23/0416 |
| | | | | 702/148 |
| 2010/0211256 | A1 * | 8/2010 | Takenaka | B60W 40/068 |
| | | | | 701/31.4 |
| 2010/0213693 | A1 * | 8/2010 | Foo | B60R 21/0136 |
| | | | | 280/735 |
| 2010/0273452 | A1 * | 10/2010 | Rajann | H04W 12/30 |
| | | | | 455/456.2 |
| 2010/0292887 | A1 * | 11/2010 | Becker | B60R 21/0132 |
| | | | | 701/31.4 |
| 2011/0112739 | A1 * | 5/2011 | O'Dea | G01S 19/52 |
| | | | | 342/357.35 |
| 2012/0016646 | A1 * | 1/2012 | Takenaka | B60T 8/172 |
| | | | | 703/2 |
| 2012/0029783 | A1 * | 2/2012 | Takenaka | B60T 8/172 |
| | | | | 701/73 |
| 2013/0173115 | A1 * | 7/2013 | Gunia | B62D 6/00 |
| | | | | 701/41 |
| 2015/0258956 | A1 * | 9/2015 | Sassi | B62D 25/2036 |
| | | | | 701/45 |
| 2017/0305416 | A1 * | 10/2017 | Yamakado | B60T 7/12 |
| 2018/0170407 | A1 * | 6/2018 | Ogawa | F16F 9/46 |
| 2019/0073540 | A1 * | 3/2019 | Yamada | G08G 1/167 |
| 2019/0126711 | A1 * | 5/2019 | Giovanardi | B60G 17/0161 |
| 2020/0031279 | A1 * | 1/2020 | Nakamura | B60Q 11/007 |
| 2021/0162965 | A1 * | 6/2021 | Mellings | B60T 8/1755 |
| 2022/0024400 | A1 * | 1/2022 | Ahmad | B60R 21/0132 |
| 2022/0055650 | A1 * | 2/2022 | Lee | B60W 40/103 |

FOREIGN PATENT DOCUMENTS

| | | | | |
|---|---|---|---|---|
| CN | 110139780 B | * | 9/2021 | ......... B60R 21/0132 |
| DE | 4208141 A1 | | 9/1992 | |
| DE | 102004037539 A1 | | 2/2006 | |
| DE | 102005035302 A1 | * | 2/2007 | ............. B60K 28/16 |
| DE | 102009046337 A1 | | 5/2011 | |
| DE | 112009002094 T5 | * | 7/2011 | .............. B60T 8/171 |
| DE | 102010027969 A1 | * | 10/2011 | ......... B60R 21/0132 |
| DE | 102010062631 A1 | * | 6/2012 | ......... B60R 21/0132 |
| DE | 112015001305 T5 | * | 1/2017 | ......... B60R 21/0132 |
| DE | 10332305 B4 | * | 10/2018 | ........... B60R 21/013 |
| DE | 102020205580 A1 | | 11/2021 | |
| DE | 102020205580 A1 | * | 11/2021 | ......... B60R 21/0132 |
| DE | 102021207974 A1 | * | 1/2022 | ......... B60R 16/0233 |
| EP | 1219500 A2 | * | 7/2002 | ......... B60R 16/0233 |
| EP | 1607273 A1 | * | 12/2005 | ......... B60R 21/0132 |
| EP | 2347934 A1 | * | 7/2011 | ......... B60R 21/0132 |
| JP | 2010506794 A | * | 3/2010 | |
| WO | WO-2007076735 A2 | * | 7/2007 | ......... B60R 21/0132 |
| WO | WO-2009003434 A1 | * | 1/2009 | ......... B60R 21/0132 |
| WO | WO-2009074391 A1 | * | 6/2009 | ......... B60R 21/0132 |
| WO | WO-2013068286 A1 | * | 5/2013 | ......... B60R 21/0132 |
| WO | WO-2017160274 A1 | * | 9/2017 | ......... B60R 21/0132 |
| WO | WO-2017160275 A1 | * | 9/2017 | ......... B60R 21/0132 |

OTHER PUBLICATIONS

"Integrated Driver-Vehicle-Infrastructure Road Departure Warning Unit," Glaser et al., IEEE Transactions on Vehicular Technology (vol. 59, Issue: 6, pp. 2757-2771); Jul. 1, 2010. (Year: 210).*

"Design of an Airbag Deployment Algorithm Based on Precrash Information;" Cho et al., IEEE Transactions on Vehicular Technology (vol. 60, Issue: 4, pp. 1438-1452); May 1, 2011. (Year: 2011).*

* cited by examiner

OFF-ZONE CRASH DETECTION USING LATERAL ACCELERATIONS AT DIFFERENT POSITIONS IN A VEHICLE

CROSS-REFERENCE TO RELATED APPLICATIONS

This application claims priority to U.S. Provisional Patent Application No. 63/057,003, filed Jul. 27, 2020, the entire contents of which are incorporated herein by reference.

FIELD OF THE INVENTION

Embodiments relate to detecting off-zone crashes involving a vehicle using lateral acceleration values detected at various locations within the vehicle.

BACKGROUND

Current vehicle safety systems include various sensors designed to detect impacts on the vehicle. However, these sensors are not optimized to detect impacts in front of the A-pillar of a vehicle (e.g., impacts occurring forward of the windshield or dashboard of the vehicle) and impacts behind the C-pillar of the vehicle (e.g., impacts occurring behind the rear windshield). These types of impacts are referred to as "off-zone impacts" or "off-zone crashes." Off-zone impacts typically occur during lane changing or merging, crossing intersections, glancing off guardrails, and other driving situations. Because these off-zone crashes are difficult to detect with conventional systems, proper actions to be taken in response to the crash may not occur.

SUMMARY

Therefore, among other objects, one object of some embodiments is to detect off-zone crashes involving the vehicle using translational accelerations from one or more acceleration sensors.

One embodiment provides a system for detecting an off-zone impact involving a vehicle. The system includes at least two acceleration sensors positioned within a body of the vehicle and an electronic processor. The electronic processor is configured to receive a first acceleration value at a centerline of the vehicle from a first acceleration sensor of the at least two acceleration sensors and receive a second acceleration value at the centerline of the vehicle from a second acceleration sensor of the at least two acceleration sensors. The electronic processor is also configured to derive an approximate yaw acceleration at the centerline of the vehicle based on the first acceleration and the second acceleration. The electronic processor is further configured to compare the approximate yaw acceleration to a threshold and initiate one or more actions in response to the yaw acceleration exceeding the threshold.

Another embodiment provides a method for detecting an off-zone impact involving a vehicle. The method includes receiving, with an electronic processor, a first acceleration value at a centerline of the vehicle from a first acceleration sensor of at least two acceleration sensors and receiving, with the electronic processor, a second acceleration value at the centerline of the vehicle from a second acceleration sensor of the at least two acceleration sensors. The method also includes deriving, with the electronic processor, an approximate yaw acceleration at the centerline of the vehicle based on the first acceleration and the second acceleration. The method further includes comparing, with the electronic processor, the approximate yaw acceleration to a threshold and initiating, with the electronic processor, one or more actions in response to the yaw acceleration exceeding the threshold.

Another embodiment provides a non-transitory, computer-readable medium containing instructions that, when executed by an electronic processor, are configured to perform a set of functions, the set of functions including receiving a first acceleration value at a centerline of the vehicle from a first acceleration sensor and receiving a second acceleration value at the centerline of the vehicle from a second acceleration sensor. The set of functions further includes deriving an approximate yaw acceleration at the centerline of the vehicle based the first acceleration and the second acceleration. The set of functions also includes comparing the approximate yaw acceleration to a threshold and initiating one or more actions in response to the yaw acceleration exceeding the threshold.

These and other features, aspects, and advantages will be apparent from a reading of the following detailed description and a review of the associated drawings. It is to be understood that both the foregoing general description and the following detailed description are explanatory and do not restrict aspects as claimed.

DETAILED DESCRIPTION

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

Figure 1:
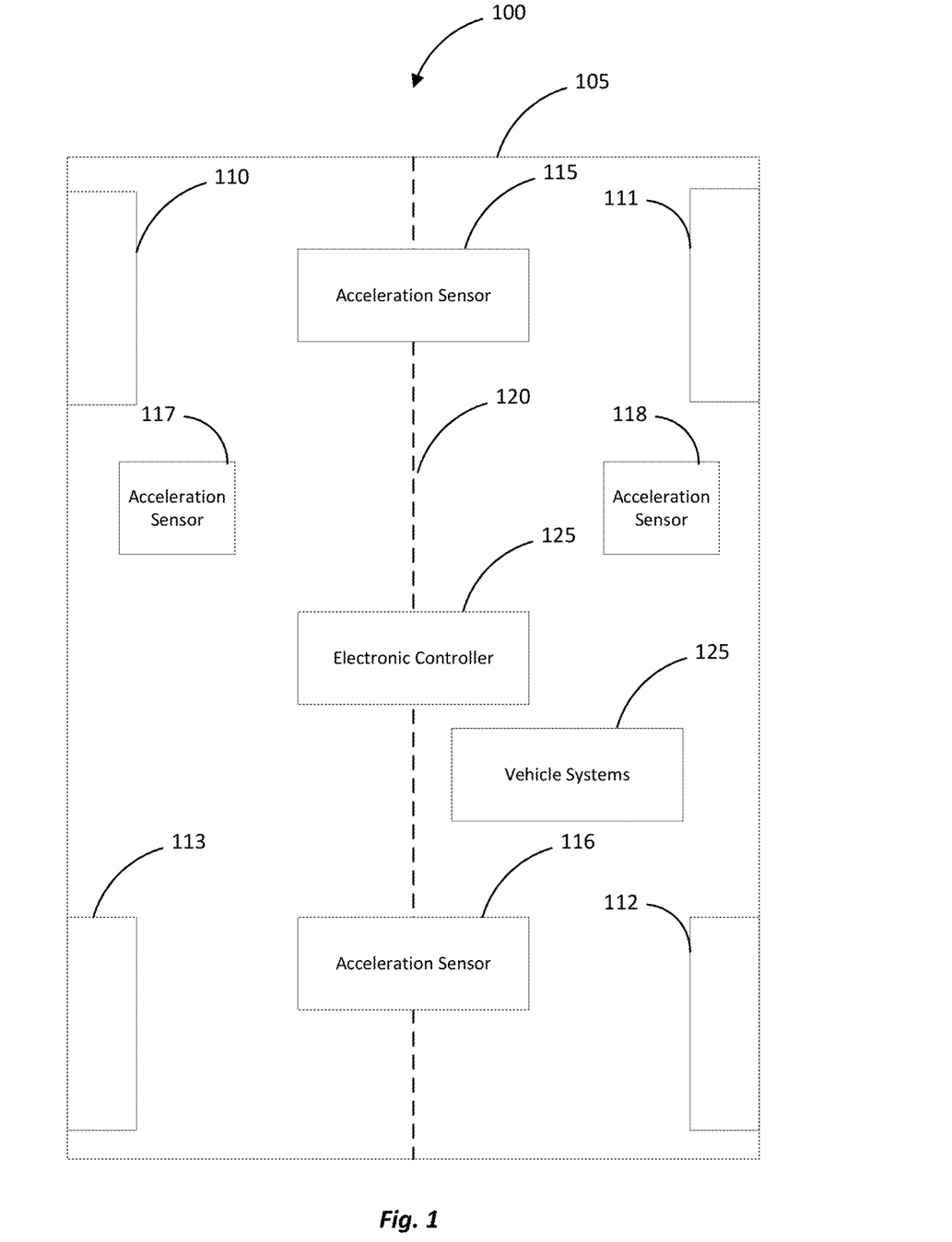
FIG. 1 illustrates a system for detecting off-zone crashes involving a vehicle according to some embodiments.

FIG. 1 illustrates an example of a system 100 for detecting off-zone crashes involving a vehicle 105. The vehicle 105 may be an automobile, a truck, a tractor trailer, or another type of vehicle. The vehicle 105 is illustrated with four wheels 110-113 but may include more or less wheels based on the type of the vehicle 105. In some embodiments, the vehicle 105 is an autonomous or semi-autonomous vehicle.

The system 100 includes at least two acceleration sensors (illustrated by first acceleration sensor 115 and second acceleration sensor 116, which may be referred to as "the acceleration sensors 115-116). The acceleration sensors 115-116 detect lateral acceleration in the body of the vehicle 105. The acceleration sensors 115-116, in one embodiment, are mounted in the body of the vehicle 105 along a centerline 120 of the vehicle 105. In another embodiment, the acceleration sensors 115-116 are located at other parts of the body of the vehicle 105, such as alternative locations 117-118. In this embodiment, the acceleration sensors 115-116 may be mounted symmetrically in the body of the vehicle 105 (e.g., at the same distance from the centerline 120). In another embodiment, at least one of the acceleration sensors 115-116 may be mounted at the center of mass of the vehicle 105. In some embodiments, the acceleration sensors 115-116 are configured to estimate lateral acceleration values at different points along the centerline 120 of the vehicle 105 even if the acceleration sensors 115-116 are not mounted or positioned along the centerline 120.

The system 100 also includes an electronic controller 125. In the illustrated embodiment, the electronic controller 125 is located at a center of mass of the vehicle 105. However, it is to be understood that the electronic controller 125 may be located at other locations within the vehicle body.

Figure 2:
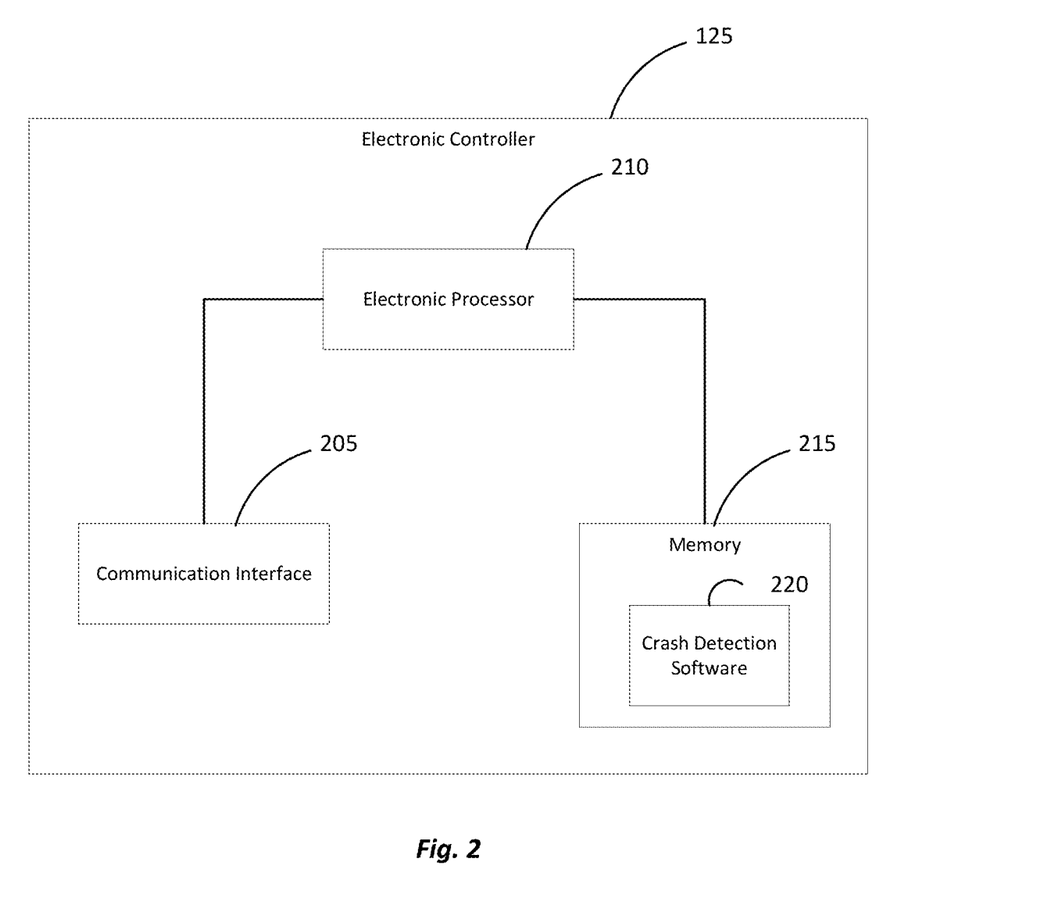
FIG. 2 illustrates an electronic controller according to some embodiments.

An example of the electronic controller 125 is illustrated in FIG. 2. The electronic controller 125 includes a communication interface 205, an electronic processor 210, and a memory 215. The communication interface 205 allows the electronic processor 210 to communicate with external hardware, such as the acceleration sensors 115-116 and/or a back-end server through wireless or wired communication techniques. The electronic processor 210 is configured to access the memory 215 and, among other things, execute instructions to carry out the methods and functions described herein. The electronic processor 210 may be a microprocessor, an application-specific integrated circuit ("ASIC"), or a similar processing circuit. The memory 215 is a non-transitory, computer-readable medium and contains instructions that, among other things, perform the methods and functions described herein when executed by the electronic processor 210.

The memory 215 includes, among other things, crash detection software 220. The crash detection software 220 uses inputs from various sensors, such as the acceleration sensors 115-116, to detect impacts involving the vehicle 105. In particular, the crash detection software 220 uses acceleration values from the acceleration sensors 115-116 to detect off-zone crashes involving the vehicle 105.

Figure 3:
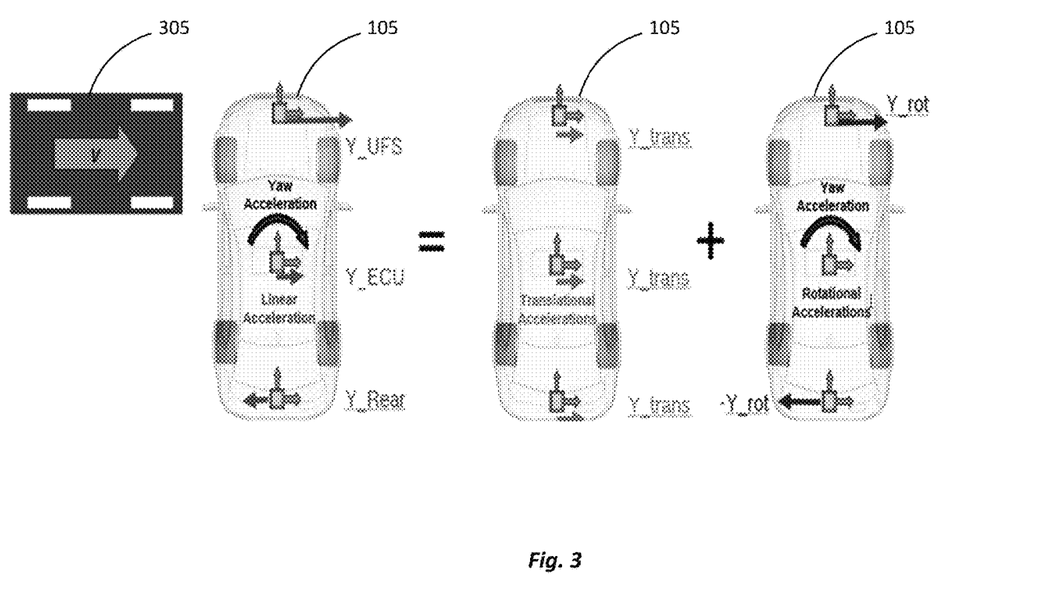
FIG. 3 illustrates a sensor configuration for gathering acceleration values in a vehicle body according to some embodiments.

FIG. 3 illustrates a sensor configuration for gathering acceleration values in a vehicle body. In these configurations, the vehicle 105 may have the acceleration sensors 115-116 positioned at any one of the locations illustrated by Y_UFS, Y_ECU, and Y_Rear. When impacting vehicle 305 contacts the vehicle 105 in an off zone, both translational acceleration and rotational acceleration, or yaw acceleration, occur in the vehicle 105. The acceleration sensors 115-116 detect the translational acceleration component of the impact.

The yaw acceleration at the centerline 120 of the vehicle 105 can be approximated using the two translational acceleration values detected by the acceleration sensors 115-116. In one embodiment, the linear acceleration at each measurement point (e.g., the acceleration sensors 115-116) can be interpreted as the sum of the translational acceleration $\vec{\alpha}_{trans}$ (which is the same value at all measurement points) and rotational acceleration around the center of mass of the vehicle 105. The rotational acceleration is determined based on a yaw acceleration and a radius vector from the center of mass to the measurement point, $\vec{\alpha}_{rot} = \vec{\omega} \times \vec{r}$, where $\vec{\omega}$ is the yaw acceleration, $\vec{\alpha}_{rot}$ the rotational acceleration, and $\vec{r}$ is the radius vector.

With two different measurement points located at different distances $r_1$ and $r_2$ from the center of mass, the linear acceleration $\alpha_{y,tot}$ at each of the measurement points can be summarized in the following equations:

$$\alpha_{y,tot1} = \alpha_{y,trans} + \dot{\omega} r_1. \qquad \text{Equation 1.}$$

$$\alpha_{y,tot2} = \alpha_{y,trans} + \dot{\omega} r_2. \qquad \text{Equation 2.}$$

The distances $r_1$ and $r_2$ are known quantities. In other words, when the acceleration sensors 115-116 are installed in the vehicle 105, the acceleration sensors 115-116 are placed at locations within the vehicle 105 that have known distances from the center of mass of the vehicle 105 and the distances do not have to be determined.

The yaw acceleration can then be obtained by taking the difference of the two linear accelerations $\alpha_{y,tot1}$, $\alpha_{y,tot2}$, as shown in Equation 3.

$$\alpha_{y,tot1} - \alpha_{y,tot2} = \dot{\omega}(r_1 - r_2). \qquad \text{Equation 3.}$$

The yaw acceleration $\dot{\omega}$ can then be derived from this difference between a first acceleration from the first acceleration sensor 115 and a second acceleration from the second acceleration sensor 116.

In a second embodiment, if one of the measurement points is located close to the center of mass of the vehicle 105 ($r_2 \approx 0$), such that rotational acceleration goes to zero, Equation 4 can be used instead to obtain the yaw acceleration by taking a quotient of the first acceleration and the second acceleration.

$$\frac{a_{y1}}{a_{y2}} = \frac{a_{y,trans} + \dot{\omega} r_1}{a_{y,trans} + \dot{\omega} r_2} = 1 + \frac{\dot{\omega} r_1}{a_{y,trans}}. \qquad \text{Equation 4}$$

Based on either Equation 3 or Equation 4, the yaw acceleration at the centerline 120 of the vehicle 105 can be derived by solving for $\dot{\omega}$.

If the acceleration sensors 115-116 are not mounted directly on the centerline 120 of the vehicle 105 the acceleration values from the acceleration sensors 115-116 are still meaningful. In particular, if one of the acceleration sensors 115-116 is replaced by a pair of sensors mounted symmetrically about the centerline 120 (for example, 115 being replaced by 2 sensors at alternative locations 117-118) (which for purposes of taxonomy or labelling may be referred to as "secondary sensors"), an average of the two acceleration sensors 117 and 118 can be taken to obtain the approximate acceleration values for the sensor 115 on centerline 120 of the vehicle 105. In other embodiments, a maximum acceleration or a minimum acceleration can be obtained by the acceleration sensors 117 and 118.

The crash detections software 220 may also include a threshold look-up table or a threshold curve. The threshold look-up table and the threshold curve contain values to compare the derived yaw acceleration to in order to determine if an off-zone crash has occurred. The look-up table and curve may be determined based on the type of the vehicle 105 (e.g., automobile vs. tractor trailer) and the vehicle structure of the vehicle 105. The derived yaw acceleration is input into the look-up table or compared to the curve and, if the derived yaw acceleration exceeds an expected value for the vehicle 105, an off-zone crash is detected. In the look-up table, the x-axis is lateral acceleration taken from one of the acceleration sensors 115-116, preferably the acceleration sensor that is closest to the center of mass of the vehicle 105. The lateral acceleration may also be obtained by taking an average of the acceleration values at the acceleration sensors 115-116, which is especially useful if one of the acceleration sensors 115-116 is mounted in a front end of the vehicle 105 and the other acceleration sensor is mounted in a rear end of the vehicle 105. Based on the latera acceleration, the threshold value is determined.

Figure 4A:
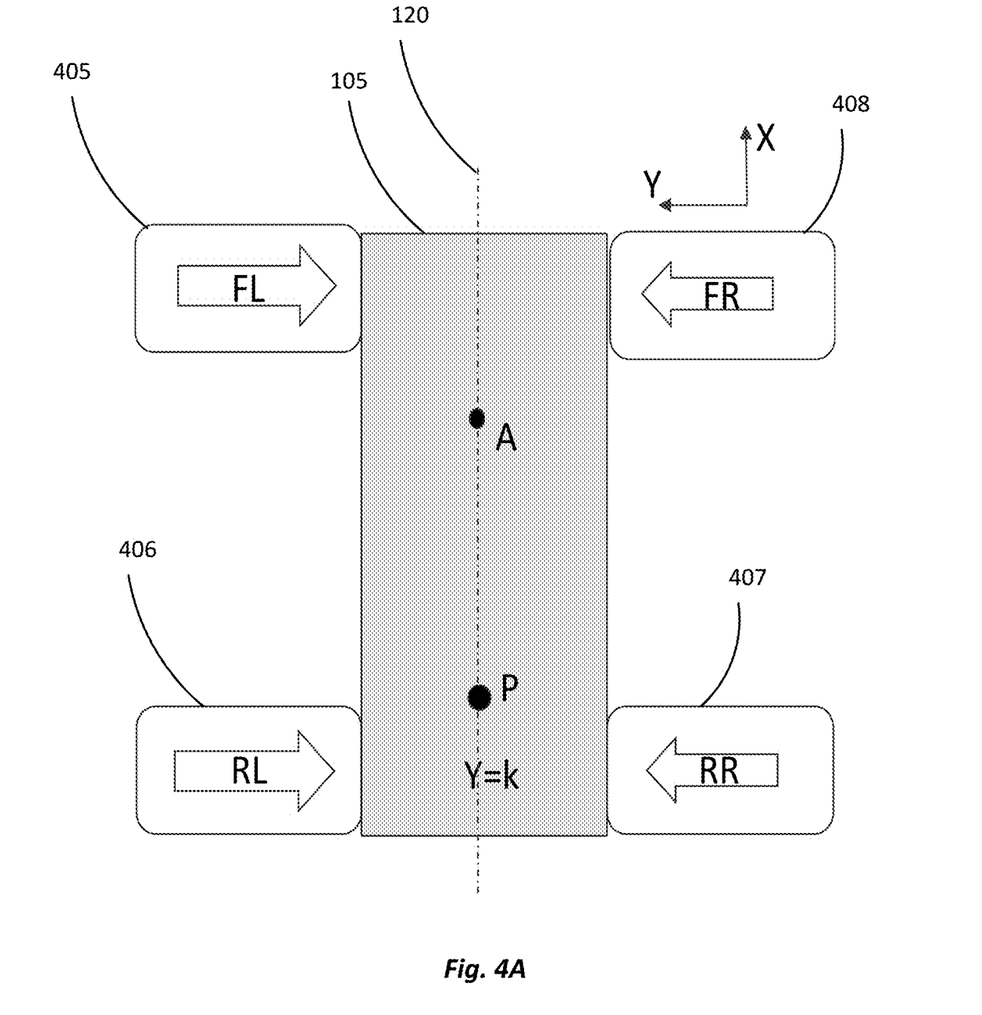
FIG. 4A illustrates impact zones on a vehicle according to some embodiments.

The crash detection software 220 also performs impact location detection. For example, FIG. 4A illustrates impact zones 405, 406, 407, and 408 on the vehicle 105. Points A and P illustrate points on the centerline 120 of the vehicle 105 at which the acceleration sensors 115-116 measure lateral accelerations. Points A and P exist on the same longitudinal line, which in this embodiment is the centerline 120. Because points A and P exist on the same longitudinal line, the acceleration at one point (for example, point P) can be characterized by Equation 5 shown below.

$$\alpha_{yP} = \alpha_{yA} + (\dot{\omega}_z) l_x. \qquad \text{Equation 5}$$

In Equation 5, $l_x$ is the longitudinal distance between points A and P on the longitudinal line both points are on (in this case, the centerline 120). From Equation 5, the yaw acceleration $\dot{\omega}_z$ can then be derived, as shown in Equation 6 below.

$$\int (\alpha_{yP} - \alpha_{yA}) dt = (\omega_z) l_x. \qquad \text{Equation 6}$$

By using the accelerations determined or estimated at points A and P, the yaw acceleration can be determined.

Figure 4B:
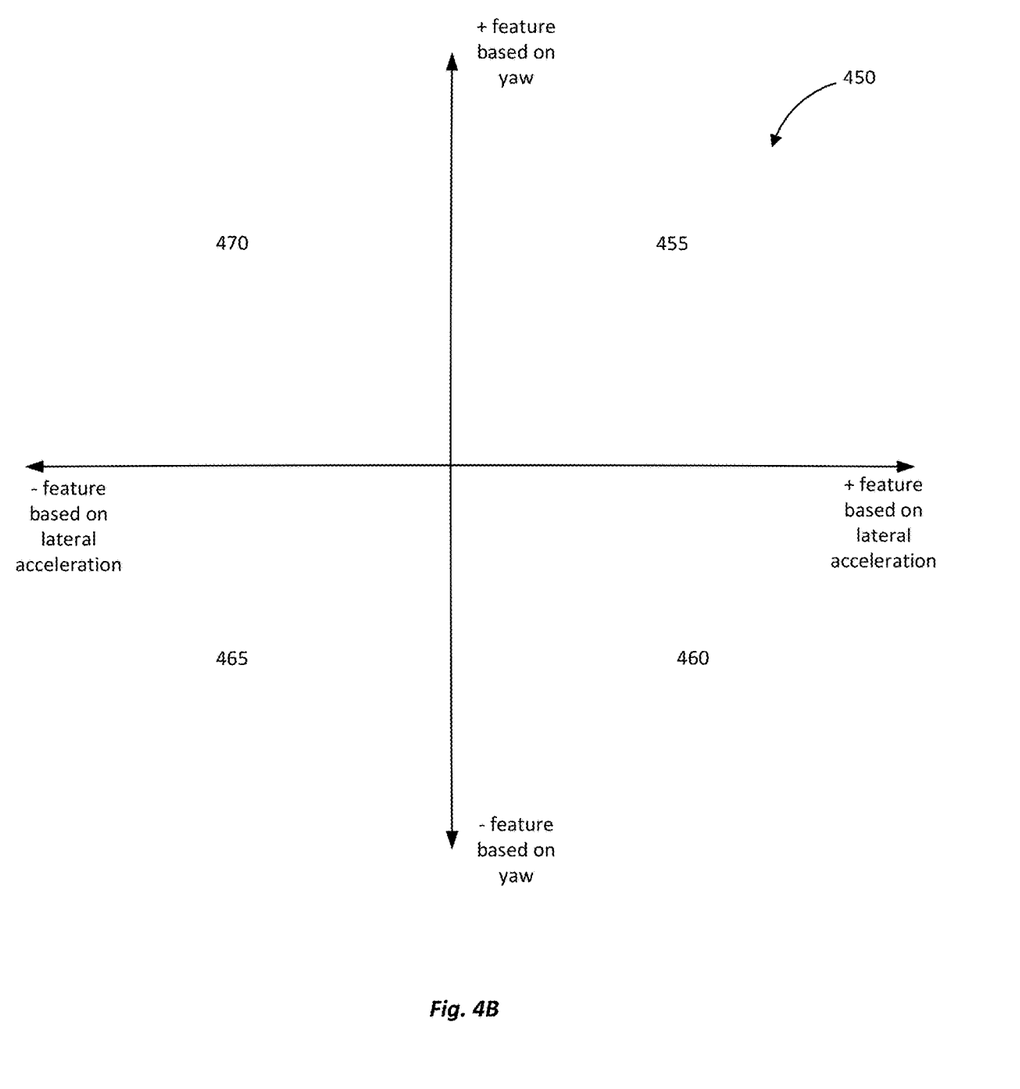
FIG. 4B is a graph illustrating how an impact zone is determined in a two-dimensional feature space according to some embodiments.

Based on the acceleration(s) determined for at least one of the points A and P, and based on the determined yaw acceleration, the crash detection software 220 performs impact location detection. The crash detection software 220 uses a two-dimensional feature space to determine which of the impact zones 405-408 has received an impact. An example of a two-dimensional feature space 450 is shown in FIG. 4B.

The two-dimensional feature space 450 illustrates a relationship between a feature based on lateral acceleration at one of the points A and P and a feature based on yaw acceleration. In the two-dimensional feature space 450, a positive value of the feature based on lateral acceleration indicates the vehicle 105 has been impacted on a right side and is moving left, and a positive value indicates of the feature based on yaw acceleration the vehicle 105 is spinning in a counter-clockwise direction. If the value of the feature based on lateral acceleration of the one of the points A and P is positive and the value of the feature based on yaw acceleration is positive (quadrant one 455), an impact is detected in impact zone 407, or a rear right impact zone. If the value of the feature based on lateral acceleration of the one of the points A and P is positive and the value of the feature based on yaw acceleration is negative (quadrant four 460), an impact is detected in impact zone 408, or a front right impact zone. If the value of the feature based on lateral acceleration of the one of the points A and P is negative and the value of the feature based on yaw acceleration is negative (quadrant three 465), an impact is detected in impact zone 406, or a rear left impact zone. If the value of the feature based on lateral acceleration of the one of the points A and P is negative and the value of the feature based on yaw acceleration is positive (quadrant two 470), an impact is detected in impact zone 405, or a front left impact zone.

Returning to FIG. 1, the electronic controller 125 is communicatively connected with the acceleration sensors 115-116 through wired means, such as a vehicle communication bus, a controller area network ("CAN") bus, or a direct electrical connection, or through wireless means, such as a wireless transceiver. The electronic controller 125 also communicates with other vehicle systems 130, such as a vehicle safety system including an airbag. In one embodiment, if the vehicle 105 is an autonomous or semi-autonomous vehicle, the electronic controller 125 may also be configured to wirelessly communicate with a back-end server at a remote location, such as a manufacturer's server, owner's server, or the like.

Figure 5:
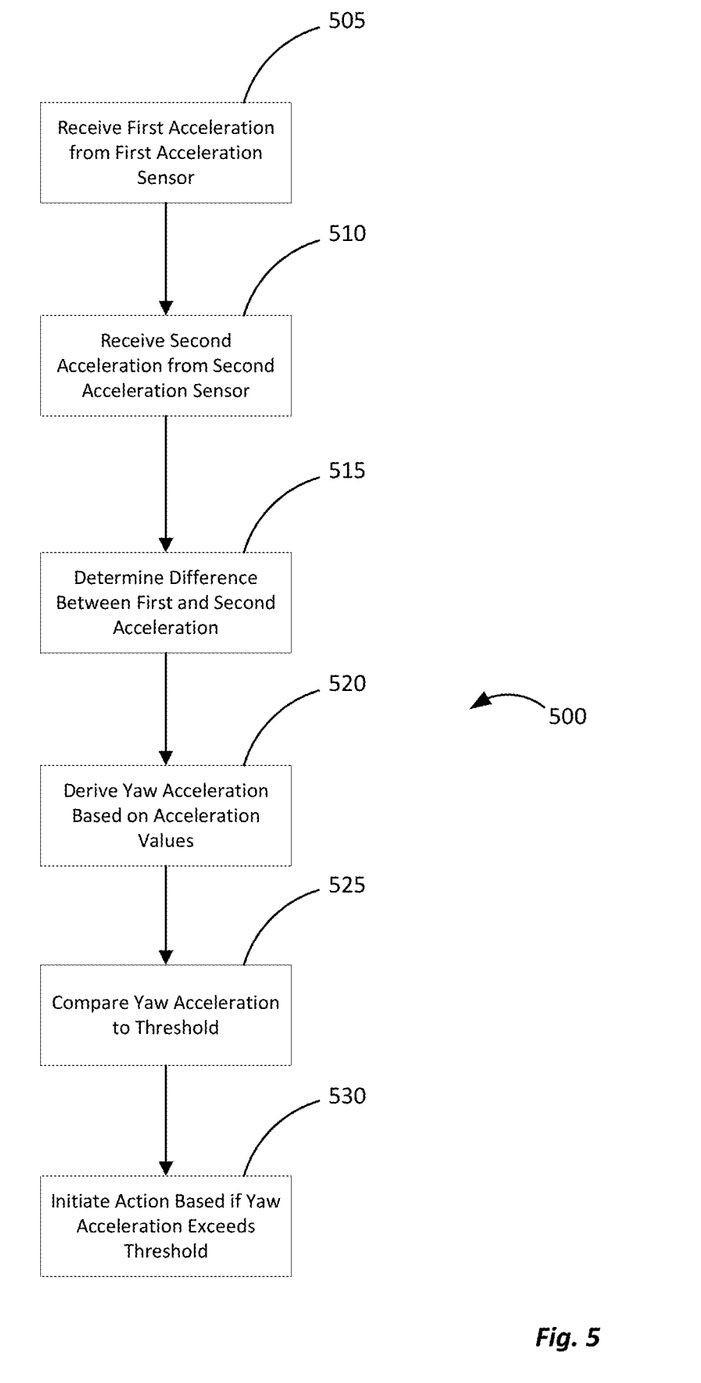
FIG. 5 illustrates a method for detecting off-zone crashes involving a vehicle according to some embodiments.

FIG. 5 illustrates a method 500 for detecting off-zone crashes involving the vehicle 105 according to one embodiment. The method 500 includes receiving, with the electronic processor 210, a first acceleration value for a point on the centerline 120 of the vehicle 105 from the first acceleration sensor 115 (block 505). The method 500 also includes receiving, with the electronic processor 210, a second acceleration value for a second point on the centerline 120 of the vehicle 150 from the second acceleration sensor 116 (block 510).

In one example, the electronic processor 210 is then determines a difference between the first acceleration and the second equation according to Equation 3 as discussed above (block 515). The approximate yaw acceleration at the centerline 120 of the vehicle 105 is then derived from the result of the difference between the first acceleration and the second acceleration according to Equation 3 (block 520).

Once the electronic processor 210 has derived the approximate yaw acceleration at the centerline 120 of the vehicle 105, the yaw acceleration is compared to threshold obtained from a look-up table or curve stored in the memory 215 (block 525). If the yaw acceleration exceeds the threshold value for the vehicle 105, an off-zone crash has been detected, and the electronic processor 210 is configured to initiate one or more actions (block 530).

In one embodiment, if an off-zone crash is detected, the electronic processor 210 may be configured to generate a command to send to the vehicle systems 130 to, among performing other safety measures, deploy airbags in the vehicle 105. In another embodiment, the electronic processor 210 is configured to also send out an alert to a back-end server associated with the vehicle 105 indicating that an off-zone crash has occurred. For example, the back-end server may be owned an owner of the vehicle 105, a manufacturer of the vehicle 105, and the like. The electronic processor 210 may also be configured to send alerts to relevant safety authorities, such as law enforcement or an ambulance service.

Figure 6:
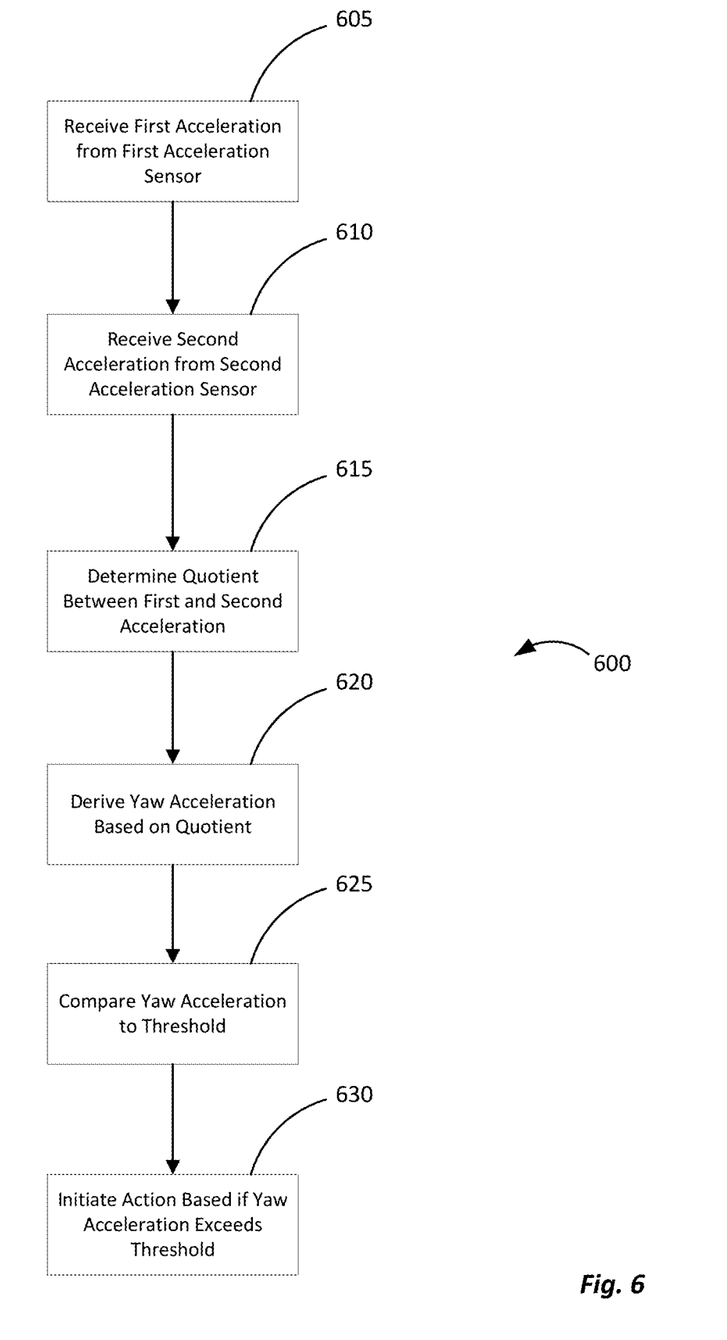
FIG. 6 illustrates a method for detecting off-zone crashes involving a vehicle according to alternative embodiments.

FIG. 6 illustrates a method 600 for detecting off-zone crashes involving the vehicle 105 according to a second embodiment. The method 600 includes receiving, with the electronic processor 210, a first acceleration from the first acceleration sensor 115 (block 605). The method 400 also includes receiving, with the electronic processor 210, a second acceleration from the second acceleration sensor 116 (block 610).

In one example, the electronic processor 210 then determines a quotient between the first acceleration and the second equation according to Equation 4 as discussed above (block 615). The approximate yaw acceleration at the centerline 120 of the vehicle 105 is then derived from the quotient between the first acceleration and the second acceleration according to Equation 4 (block 620).

Once the electronic processor 210 has derived the approximate yaw acceleration at the centerline 120 of the vehicle 105, the yaw acceleration is compared to threshold obtained from a look-up table or curve stored in the memory 215 (block 625). If the yaw acceleration exceeds the threshold value for the vehicle 105, an off-zone crash has been detected, and the electronic processor 210 is configured to initiate one or more actions (block 630), such as deploying airbags in the vehicle 105 or sending alerts to a back-end server as described above.

The following examples illustrate example systems and methods described herein. Example 1: a system for detecting an off-zone impact involving a vehicle, the system comprising at least two acceleration sensors positioned within a body of the vehicle; and an electronic processor configured to receive a first acceleration value at a centerline of the vehicle from a first acceleration sensor of the at least two acceleration sensors; receive a second acceleration value at the centerline of the vehicle from a second acceleration sensor of the at least two acceleration sensors; derive an approximate yaw acceleration at the centerline of the vehicle based on the first acceleration value and the second acceleration value; compare the approximate yaw acceleration to a threshold; and initiate one or more actions in response to the yaw acceleration exceeding the threshold.

Example 2: the system of example 1, wherein the first acceleration sensor and the second acceleration sensor are positioned at the centerline of the vehicle.

Example 3: the system of either example 1 or example 2, wherein the first acceleration sensor and the second acceleration sensor are located at two different longitudinal distances from a center of mass of the vehicle.

Example 4: the system of any of examples 1-3, wherein one of the group consisting of the first acceleration sensor and the second acceleration sensor comprises a pair of secondary sensors positioned symmetrically within the body of the vehicle.

Example 5: the system of any of examples 1-4, wherein the threshold is determined based on at least one of the first acceleration value and the second acceleration value.

Example 6: the system of any of examples 1-5, wherein the one or more actions includes deploying a safety system of the vehicle.

Example 7: the system of any of examples 1-6, wherein the one or more actions includes sending one or more alerts to a back-end system associated with the vehicle.

Example 8: a method for detecting an off-zone impact involving a vehicle, the method comprising receiving, with an electronic processor, a first acceleration value at a centerline of the vehicle from a first acceleration sensor of at least two acceleration sensors; receiving, with the electronic processor, a second acceleration value at the centerline of the vehicle from a second acceleration sensor of the at least two acceleration sensors; deriving, with the electronic processor, an approximate yaw acceleration at the centerline of the vehicle based on the first acceleration value and the second acceleration value; comparing, with the electronic processor, the approximate yaw acceleration to a threshold; and initiating, with the electronic processor, one or more actions in response to the yaw acceleration exceeding the threshold.

Example 9: the method of example 8, wherein the first acceleration sensor and the second acceleration sensor are positioned at the centerline of the vehicle.

Example 10 the method of either example 8 or example 9, wherein the first acceleration sensor and the second acceleration sensor are located at two different longitudinal distances from a center of mass of the vehicle.

Example 11: the method of any of examples 8-10, wherein one of the group consisting of the first acceleration sensor and the second acceleration sensor comprises a pair of secondary sensors positioned symmetrically within the body of the vehicle.

Example 12: the method of method of any of examples 8-11, wherein the threshold is determined based on at least one of the first acceleration value and the second acceleration value.

Example 13: the method of any of examples 8-12 wherein the one or more actions includes deploying a safety system of the vehicle.

Example 14: the method of any of examples 8-13, wherein the one or more actions includes sending one or more alerts to a back-end system associated with the vehicle.

Example 15: a non-transitory, computer-readable medium containing instructions that, when executed by an electronic processor, are configured to perform a set of functions, the set of functions including receiving a first acceleration value at a centerline of the vehicle from a first acceleration sensor located in a body of the vehicle; receiving a second acceleration value at the centerline of the vehicle from a second acceleration sensor located in the body of the vehicle; deriving an approximate yaw acceleration at the centerline of the vehicle based on the first acceleration value and the second acceleration value; comparing the approximate yaw acceleration to a threshold; and initiating one or more actions in response to the yaw acceleration exceeding the threshold.

Example 16: the non-transitory, computer-readable medium of example 15, wherein the first acceleration value and the second acceleration value are translational acceleration values.

Example 17: the non-transitory, computer-readable medium of either example 15 or example 16, wherein the threshold is determined based on at least one of the first acceleration value and the second acceleration value.

Example 18: the non-transitory, computer-readable medium of example 17, wherein the threshold is determined using a look-up table.

Example 19: the non-transitory, computer-readable medium of example 17, wherein the threshold is determined using a curve.

Example 20: the non-transitory, computer-readable medium of any of examples 15-19, wherein the one or more actions includes deploying a safety system of the vehicle.

Thus, embodiments described herein provide, among other things, systems and methods for detecting off-zone crashes involving a vehicle. Various features, advantages, and embodiments are set forth in the following claims.

What is claimed is:

1. A system for detecting an off-zone impact involving a vehicle, the system comprising:
   at least two acceleration sensors positioned within a body of the vehicle; and
   an electronic processor configured to
      receive a first translational acceleration value for a first point at a centerline of the vehicle-from a first acceleration sensor of the at least two acceleration sensors, the first acceleration sensor positioned at a first known distance from a center of mass of the vehicle;
      receive a second translational acceleration value for a second point at the centerline of the vehicle from a second acceleration sensor of the at least two acceleration sensors, the second acceleration sensor positioned at a second known distance from a center of mass of the vehicle;
      derive an approximate yaw acceleration at the centerline of the based on the first translational acceleration value, the second translational acceleration value, the first known distance, and the second known distance;
      compare the approximate yaw acceleration to a threshold; and
      initiate one or more actions in response to the yaw acceleration exceeding the threshold.

2. The system of claim 1, wherein the first acceleration sensor and the second acceleration sensor are positioned at the centerline of the vehicle.

3. The system of claim 1, wherein the first acceleration sensor and the second acceleration sensor are located at two different longitudinal distances from a center of mass of the vehicle.

4. The system of claim 1, wherein one of the group consisting of the first acceleration sensor and the second acceleration sensor comprises a pair of secondary sensors positioned symmetrically within the body of the vehicle.

5. The system of claim 1, wherein the threshold is determined based on at least one of the first acceleration value and the second acceleration value.

6. The system of claim 1, wherein the one or more actions includes at least one of deploying a safety system of the vehicle and sending one or more alerts to a back-end system associated with the vehicle.

7. The system of claim 1, wherein the electronic processor is further configured to determine a location of the off-zone impact based the approximate yaw acceleration and at least one of the first acceleration value and the second acceleration value.

8. A method for detecting an off-zone impact involving a vehicle, the method comprising
   receiving, with an electronic processor, a first translational acceleration value at a centerline of the vehicle from a first acceleration sensor of at least two acceleration sensors, the first acceleration sensor positioned at a first known distance from a center of mass of the vehicle;
   receiving, with the electronic processor, a second translational acceleration value at the centerline of the vehicle from a second acceleration sensor of the at least two acceleration sensors, the second acceleration sensor positioned at a second known distance from a center of mass of the vehicle;
   deriving, with the electronic processor, an approximate yaw acceleration at the centerline of the vehicle based on the first translational acceleration value, the second translational acceleration value, the first known distance, and the second known distance;
   comparing, with the electronic processor, the approximate yaw acceleration to a threshold; and
   initiating, with the electronic processor, one or more actions in response to the yaw acceleration exceeding the threshold.

9. The method of claim 8, wherein the first acceleration sensor and the second acceleration sensor are positioned at the centerline of the vehicle.

10. The method of claim 8, wherein the first acceleration sensor and the second acceleration sensor are located at two different longitudinal distances from a center of mass of the vehicle.

11. The method of claim 8, wherein one of the group consisting of the first acceleration sensor and the second acceleration sensor comprises a pair of secondary sensors positioned symmetrically within the body of the vehicle.

12. The method of claim 8, wherein the threshold is determined based on at least one of the first acceleration value and the second acceleration value.

13. The method of claim 8, wherein the one or more actions includes at least one of deploying a safety system of the vehicle and sending one or more alerts to a back-end system associated with the vehicle.

14. The method of claim 8, wherein the electronic processor is further configured to determine a location of the off-zone impact based the approximate yaw acceleration and at least one of the first acceleration value and the second acceleration value.

15. A non-transitory, computer-readable medium containing instructions that, when executed by an electronic processor, are configured to perform a set of functions, the set of functions including
   receiving a first translational acceleration value at a centerline of the vehicle from a first acceleration sensor located in a body of the vehicle, the first acceleration sensor positioned at a second known distance from a center of mass of the vehicle;
   receiving a second translational acceleration value at the centerline of the vehicle from a second acceleration sensor located in the body of the vehicle, the second acceleration sensor positioned at a second known distance from a center of mass of the vehicle;

deriving an approximate yaw acceleration at the centerline of the vehicle based on the first translational acceleration value, the second translational acceleration value, the first known distance, and second known distance;

comparing the approximate yaw acceleration to a threshold; and initiating one or more actions in response to the yaw acceleration exceeding the threshold.

16. The non-transitory, computer-readable medium of claim 15, wherein the first acceleration value and the second acceleration value are translational acceleration values.

17. The non-transitory, computer-readable medium of claim 15, wherein the threshold is determined based on at least one of the first acceleration value and the second acceleration value.

18. The non-transitory, computer-readable medium of claim 17, wherein the threshold is determined using a look-up table.

19. The non-transitory, computer-readable medium of claim 17, wherein the threshold is determined using a curve.

20. The non-transitory, computer-readable medium of claim 15, wherein the instructions further comprise determining a location of the off-zone impact based on the approximate yaw acceleration and at least one of the first acceleration value and the second acceleration value.

\* \* \* \* \*